(12) United States Patent
Aota et al.

(10) Patent No.: US 8,512,198 B2
(45) Date of Patent: Aug. 20, 2013

(54) AUTOMATIC TRANSMISSION

(75) Inventors: Kazuaki Aota, Sagamihara (JP);
Yukiyoshi Inuta, Isehara (JP); Akihiro Yamamoto, Hiratsuka (JP); Takayuki Okuda, Atsugi (JP); Kazuo Oguri, Hiroshima (JP); Katsunori Yamashita, Shizuoka (JP)

(73) Assignee: Jatco Ltd, Fuji-shi (JP)

( * ) Notice: Subject to any disclaimer, the term of this patent is extended or adjusted under 35 U.S.C. 154(b) by 3 days.

(21) Appl. No.: 13/402,416

(22) Filed: Feb. 22, 2012

(65) Prior Publication Data

US 2012/0244988 A1    Sep. 27, 2012

(30) Foreign Application Priority Data

Mar. 24, 2011   (JP) .................................. 2011-065263

(51) Int. Cl.
*F16H 3/44* (2006.01)
(52) U.S. Cl.
USPC ........................................................ 475/281
(58) Field of Classification Search
None
See application file for complete search history.

(56) References Cited

U.S. PATENT DOCUMENTS

| | | | | |
|---|---|---|---|---|
| 3,951,010 A * | 4/1976 | Polak | | 475/276 |
| 5,133,697 A * | 7/1992 | Hattori | | 475/276 |
| 5,435,792 A * | 7/1995 | Justice et al. | | 475/276 |
| 7,052,430 B2 * | 5/2006 | Stevenson et al. | | 475/278 |
| 7,131,925 B2 * | 11/2006 | Shim | | 475/277 |
| 7,566,285 B2 * | 7/2009 | Shim | | 475/278 |
| 7,674,200 B2 * | 3/2010 | Shim | | 475/281 |

FOREIGN PATENT DOCUMENTS

JP    10-306855 A    11/1998

\* cited by examiner

*Primary Examiner* — Dirk Wright
(74) *Attorney, Agent, or Firm* — Foley & Lardner LLP

(57) ABSTRACT

An automatic transmission includes: a first planetary gearset including a first sun gear, a first ring gear, and a first pinion carrier; a second planetary gearset including a second sun gear, a second ring gear, and a second pinion carrier; an input shaft constantly coupled to the first sun gear; an output shaft constantly coupled to the second pinion carrier; a first rotary member constantly connecting the first ring gear and the second sun gear; a first friction element selectively connecting the first sun gear and the second ring gear; a second friction element selectively connecting the first pinion carrier and the second ring gear; a third friction element selectively interrupting a rotation of the first pinion carrier; and a fourth friction element selectively interrupting a rotation of the first rotary member, the automatic transmission attaining first to fourth forward speeds and one reverse speed.

8 Claims, 14 Drawing Sheets

| | | | | | | ρ1 = 0.600  RC = 4.00 | |
| | | | | | | ρ2 = 0.500  Rev/1st = 1.250 | |
| | C1 | C2 | B1 | B2 | OWC | GEAR RATIO | STEP RATIO |
|---|---|---|---|---|---|---|---|
| 1st | | ○ | | ○ | | 4.000 | 1.867 |
| 2nd | ○ | | (○) | | ○ | 2.143 | 1.429 |
| 3rd | ○ | | | ○ | | 1.500 | 1.500 |
| 4th | ○ | ○ | | | | 1.000 | |
| Rev | | ○ | ○ | | | -5.000 | |

|  | C1 | C2 | B1 | B2 | B3 | GEAR RATIO | STEP RATIO |
|---|---|---|---|---|---|---|---|
| | | | | | | ρ1 = 0.43  RC = 4.029 ρ2 = 0.55  Rev/1st = 0.826 | |
| 1st | O | | | | O | 2.82 | 1.819 |
| 2nd | | O | | | O | 1.55 | 1.55 |
| 3rd | O | O | | | | 1.00 | 1.429 |
| 4th | | O | O | | | 0.70 | |
| Rev | O | | | O | | 2.33 | |

AUTOMATIC TRANSMISSION

BACKGROUND OF THE INVENTION

This invention relates to a stepwise automatic transmission for a vehicle.

A Japanese Patent Application Publication No. 10-306855 discloses an automatic transmission configured to attain four forward speeds and one rearward speed by two planetary gearsets and five friction elements. This automatic transmission includes two single-pinion planetary gearsets, two clutches, and three brakes.

SUMMARY OF THE INVENTION

However, this conventional automatic transmission includes five friction elements for attaining the four forward speeds and one reverse speed. Accordingly, there is room to attain size reduction, weight reduction, and cost reduction by decreasing the number of the components by decreasing the number of the friction elements.

It is, therefore, an object of the present invention to provide an automatic transmission to attain size reduction, weight reduction, and cost reduction while attaining four forward speeds and one reverse speed.

According to one aspect of the present invention, an automatic transmission comprises: a first planetary gearset including a first sun gear, a first ring gear, and a first pinion carrier as a single-pinion carrier which supports a first pinion gear engaged with the first sun gear and the first ring gear; a second planetary gearset including a second sun gear, a second ring gear, and a second pinion carrier as a single-pinion carrier which supports a second pinion gear engaged with the second sun gear and the second ring gear; an input shaft constantly coupled to the first sun gear; an output shaft constantly coupled to the second pinion carrier; a first rotary member constantly connecting the first ring gear and the second sun gear; a first friction element selectively connecting the first sun gear and the second ring gear; a second friction element selectively connecting the first pinion carrier and the second ring gear; a third friction element selectively interrupting a rotation of the first pinion carrier; and a fourth friction element selectively interrupting a rotation of the first rotary member, the automatic transmission attaining first to fourth forward speeds and one reverse speed.

According to another aspect of the invention, an automatic transmission comprises: a first planetary gearset including a first sun gear, a first ring gear, and a first pinion carrier as a single-pinion carrier which supports a first pinion gear engaged with the first sun gear and the first ring gear; a second planetary gearset including a second sun gear, a second ring gear, and a second pinion carrier as a double-pinion carrier which supports second pinion gears engaged, respectively, with the second sun gear and the second ring gear; an input shaft constantly coupled to the first sun gear; an output shaft constantly coupled to the second ring gear; a first rotary member constantly connecting the first ring gear and the second sun gear; a first friction element selectively connecting the first sun gear and the second pinion carrier; a second friction element selectively connecting the first pinion carrier and the second pinion carrier; a third friction element selectively interrupting a rotation of the first pinion carrier; and a fourth friction element selectively interrupting a rotation of the first rotary member, the automatic transmission attaining first to fourth forward speeds and one reverse speed.

DETAILED DESCRIPTION OF THE INVENTION

Automatic transmissions according to first and second embodiments of the present invention will be explained hereinafter with reference to the accompanying drawings.

First Embodiment

Figures 1, 2:
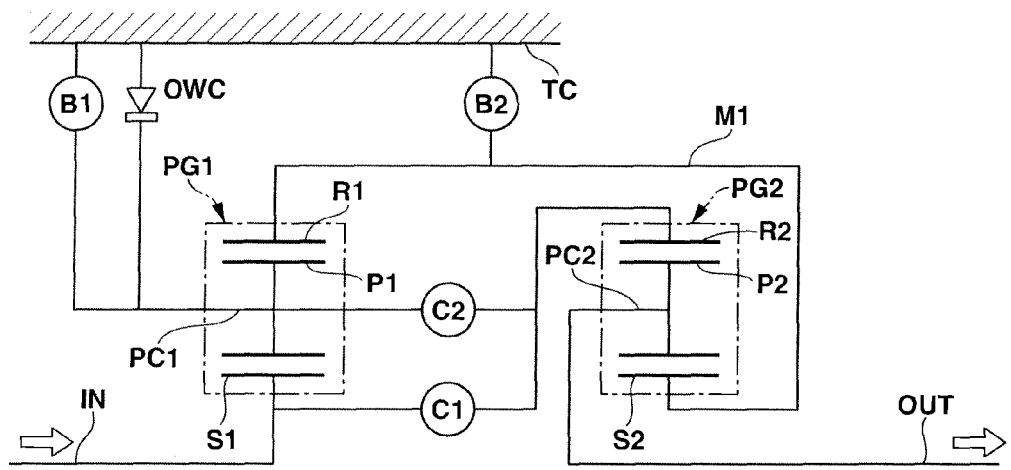
FIG. 1 is a skeleton diagram showing an automatic transmission according to a first embodiment of the present invention.
FIG. 2 is a table showing an engagement schedule in the automatic transmission according to the first embodiment for attaining four forward speeds and one rearward speed.

FIG. 1 is a skeleton diagram showing an automatic transmission according to a first embodiment. Hereinafter, a construction of planetary gearsets and a construction of friction elements in the automatic transmission according to the first embodiment are explained by referring to FIG. 1.

As shown in FIG. 1, the automatic transmission according to the first embodiment includes a first planetary gearset PG1, a second planetary gearset PG2, an input shaft IN, an output shaft OUT, a first rotary member M1, a first clutch C1 (i.e., first friction element), a second clutch C2 (i.e., second friction element), a first brake B1 (i.e., third friction element), a second brake B2 (i.e., fourth friction element), and a transmission case TC.

First planetary gearset PG1 is a single-pinion planetary gearset including a first sun gear S1, a first pinion carrier PC1 as a single-pinion carrier which supports a first pinion gear P1, and a first ring gear R1. First pinion gear P1 is in meshing engagement with first sun gear S1. First ring gear R1 is in meshing engagement with first pinion gear P1.

Second planetary gearset PG2 is a single-pinion planetary gearset including a second sun gear S2, a second pinion carrier PC2 as a single-pinion carrier which supports a second pinion gear P2, and a second ring gear R2. Second pinion gear P2 is in meshing engagement with second sun gear S2. Second ring gear R2 is in meshing engagement with pinion gear P2.

Input shaft IN receives a driving torque which is transmitted from a drive source such as an engine via a torque converter and the like. Input shaft IN is always connected to first sun gear S1.

Output shaft OUT outputs a driving torque after shifting to driving wheels through a propeller shaft, a final gear and the like. Output shaft OUT is always connected to first pinion carrier PC1.

First rotary member M1 is a rotary member which always connects first ring gear R1 and second sun gear S2 to each other without intervention of a friction element.

First clutch C1 is the first friction element which selectively connects first sun gear S1 and second ring gear R2

Second clutch C2 is the second friction element which selectively connects first pinion carrier PC1 and second ring gear R2.

First brake B1 is the third friction element which is arranged to interrupt rotation of first pinion carrier PC1 relative to transmission case TC. A One-way clutch OWC is disposed parallel to first brake B1. One-way clutch OWC is arranged to self-lock in the driving state, and to self-release in the coasting state.

Second brake B2 is the fourth friction element which is arranged to interrupt rotation of first rotary member M1 relative to transmission case TC.

As shown in FIG. 1, first planetary gearset PG1 and second planetary gearset PG2 are arranged in this order in a direction extending from input shaft IN to be connected with the drive source toward output shaft OUT.

FIG. 2 is a table showing an engagement schedule in the automatic transmission according to the first embodiment. Hereinafter, a shift construction to attain gear stages (shift stages) of the automatic transmission according to the first embodiment is illustrated.

As shown in FIG. 2, the automatic transmission according to the first embodiment establishes the respective gear stages, that is, four forward speeds and one reverse speed by simultaneous engagement of two friction elements selected from four friction elements C1, C2, B1, and B2, as explained below.

As shown in FIG. 2, the first speed (1st) is established by simultaneous engagement of second clutch C2 and second brake B2.

As shown in FIG. 2, the second speed (2nd) is established by simultaneous engagement of first clutch C1 and first brake B1 (or one-way clutch OWC).

As shown in FIG. 2, the third speed (3rd) is established by simultaneous engagement of first clutch C1 and second brake B2.

As shown in FIG. 2, the fourth speed (4th) is established by simultaneous engagement of first clutch C1 and second clutch C2.

As shown in FIG. 2, the reverse speed (Rev) is established by simultaneous engagement of second clutch C2 and first brake B1.

An operation of the automatic transmission according to the first embodiment will be explained hereinafter with respect to "a shift operation at the respective gear stages", "an advantage in comparison to a conventional example", and "an effect by the one-way clutch".

[Shift Operation at Respective Gear Stages]
(First Speed)

Figure 3A:
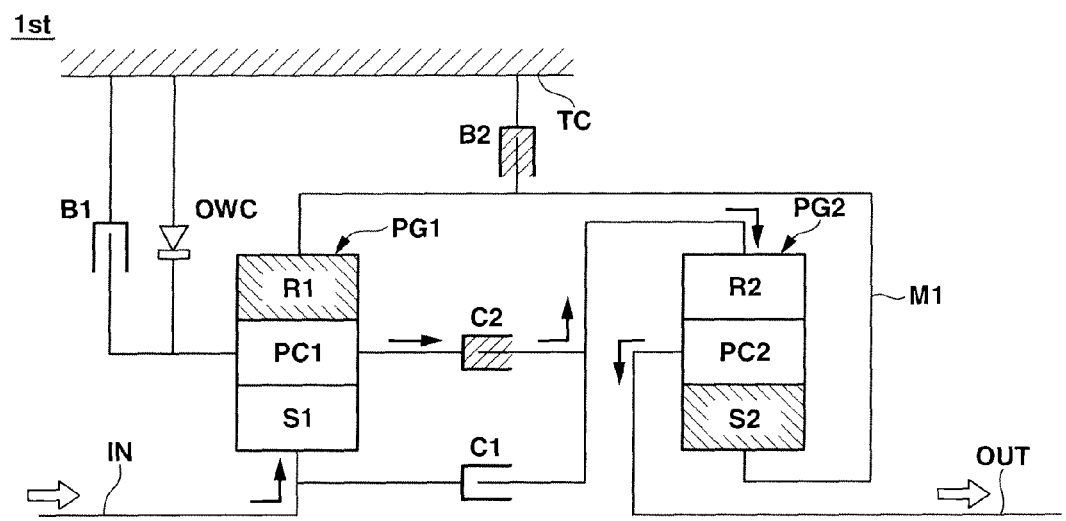
FIG. 3A is an explanatory diagram showing a shift operation at a first speed (1st) in the automatic transmission according to the first embodiment.

At the first speed (1st), second clutch C2 and second brake B2 are brought into simultaneous engagement as indicated by hatching in FIG. 3A.

First pinion carrier PC1 and second ring gear R2 are directly connected to each other by the engagement of second clutch C2. First rotary member M1 is fixed to transmission case TC by the engagement of second brake B2.

Figure 3B:
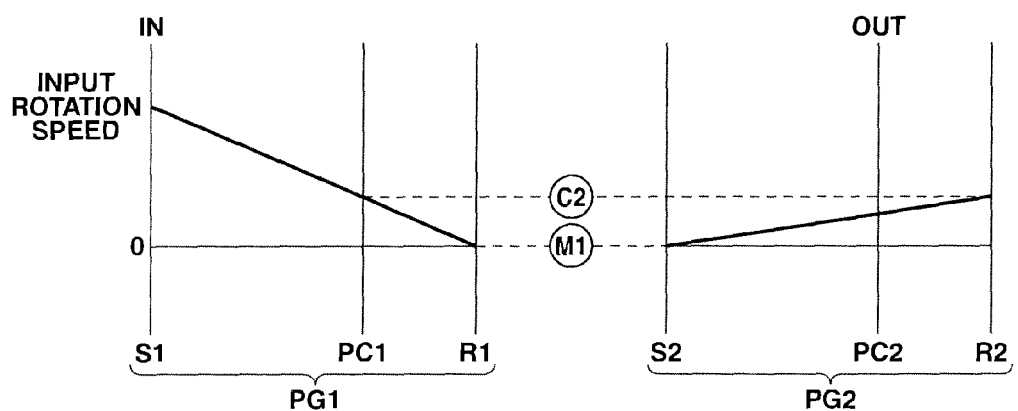
FIG. 3B is a speed diagram.

Accordingly, when input shaft IN is rotated by the input rotation speed, the input rotation speed is inputted to first sun gear S1, as shown in FIG. 3B. Then, first planetary gearset PG1 with first ring gear R1 being kept fixed is operated to reduce the input rotation speed, and to output the speed-reduced rotation from first pinion carrier PC1. This speed-reduced rotation from first pinion carrier PC1 is inputted directly to second ring gear R2 through second clutch C2. Second planetary gearset PG2 with second sun gear S2 being kept fixed is operated to further reduce this rotation of second ring gear R2, and the rotation speed of second pinion carrier PC2 is determined. This output rotation speed from second pinion carrier PC2 (=the reduced rotation speed lower than the input rotation speed) is transmitted directly to output shaft OUT, so that the first speed is attained.

(Second Speed)

Figure 4A:
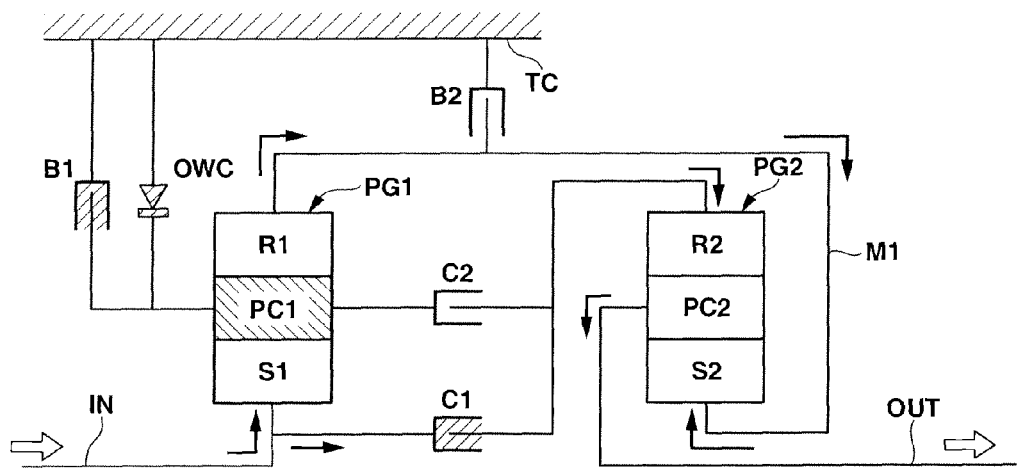
FIG. 4A is an explanatory diagram showing a shift operation at a second speed (2nd) in the automatic transmission according to the first embodiment.

At the second speed (2nd), first clutch C1 and one-way clutch OWC are brought into simultaneous engagement in the driving state, and first clutch C1 and first brake B1 are brought into simultaneous engagement in the coasting state, as indicated by hatching in FIG. 4A.

Input shaft IN, first sun gear S1, and second ring gear R2 are directly connected to each other by the engagement of first clutch C1. First pinion carrier PC1 is fixed to transmission case TC by the engagement of first brake B1 or one way clutch OWC.

Figure 4B:
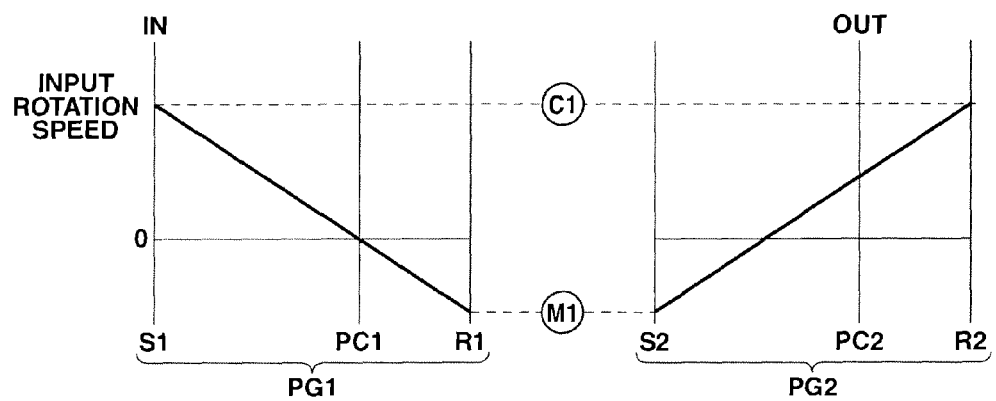
FIG. 4B is a speed diagram.

Accordingly, when input shaft IN is rotated by the input rotation speed, the input rotation speed is inputted to first sun gear S1 and second ring gear R2, as shown in FIG. 4B. Consequently, first planetary gearset PG1 with first pinion carrier PC1 being kept fixed is operated to reverse the input rotation, and to output the reversed rotation from first ring gear R1. This rotation from first ring gear R1 is inputted directly to second sun gear S2 through first rotary member M1. Therefore, in second planetary gearset PG2 having two inputs and one output, the rotation speed of second sun gear S2 and the rotation speed of second ring gear R2 (=the input rotation speed) are determined. With this, the rotation speed of second pinion carrier PC2 is determined. This output rotation speed from second pinion carrier PC2 (=the reduced rotation speed which is lower than the input rotation speed, and which is higher than the first speed) is transmitted directly to output shaft OUT, so that the second speed is attained.

(Third Speed)

Figure 5A:
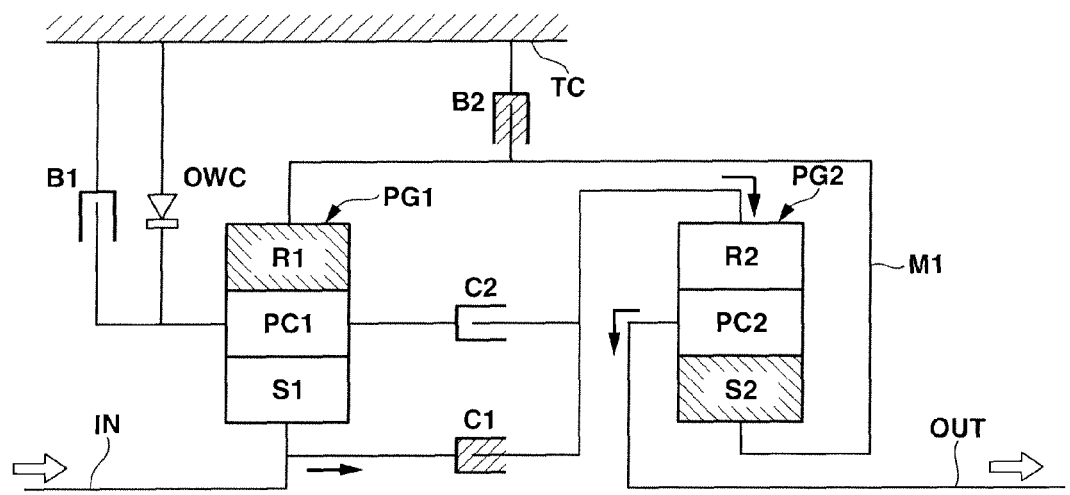
FIG. 5A is an explanatory diagram showing a shift operation at a third speed (3rd) in the automatic transmission according to the first embodiment.

At the third speed (3rd), first clutch C1 and second brake B2 are brought into simultaneous engagement as indicated by hatching in FIG. 5A.

Input shaft IN, first sun gear S1, and second ring gear R2 are directly connected to each other by the engagement of first clutch C1. First ring gear R1 and second sun gear S2 are fixed to transmission case TC by the engagement of second brake B2 and first rotary member M1.

Figure 5B:
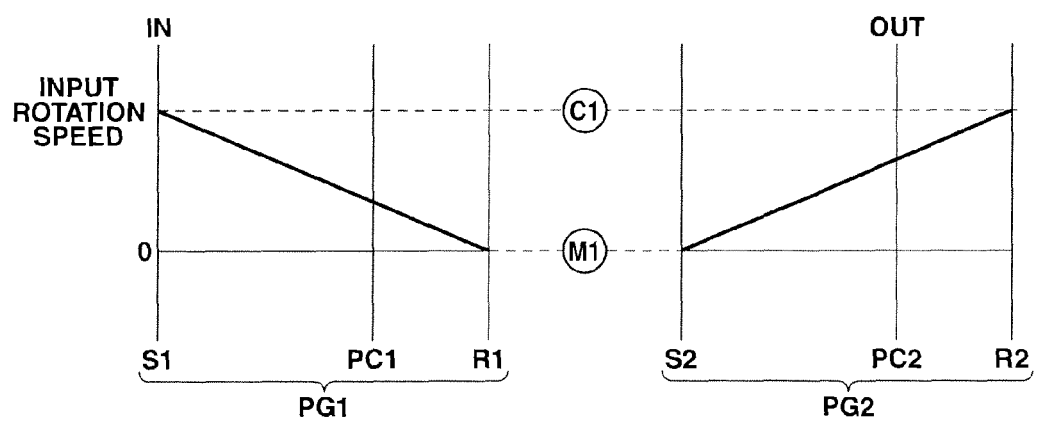
FIG. 5B is a speed diagram.

Accordingly, when input shaft IN is rotated by the input rotation speed, the input rotation speed is inputted to second ring gear R2 through first clutch C1, as shown in FIG. 5B. Consequently, second planetary gearset PG2 with second sun gear S2 being kept fixed is operated to reduce the input rotation speed, and to output the speed-reduced rotation from second pinion carrier PC2. This output rotation speed from second pinion carrier PC2 (=the reduced rotation speed which is lower than the input rotation speed, and which is higher than the second speed) is transmitted directly to output shaft OUT, so that the third speed is attained.

(Fourth Speed)

Figure 6A:
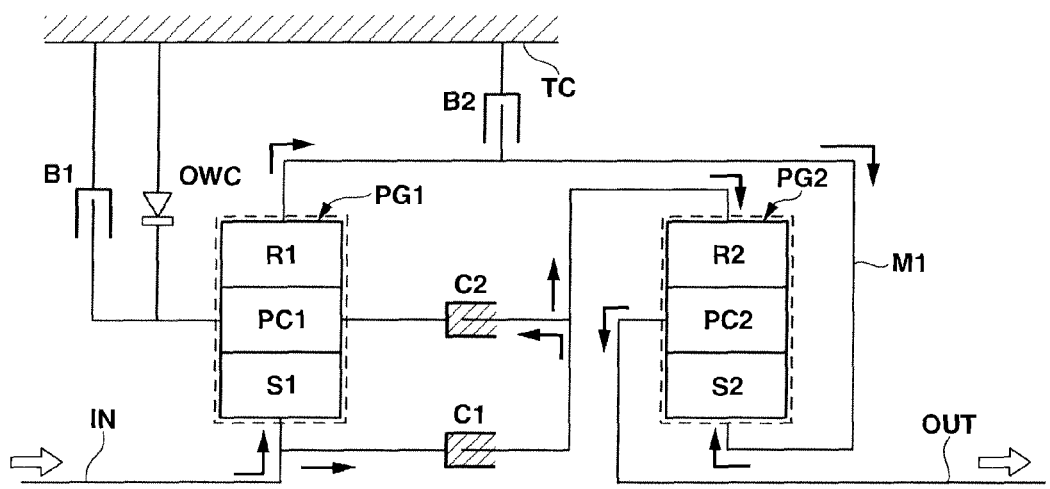
FIG. 6A is an explanatory diagram showing a shift operation at a fourth speed (4th) in the automatic transmission according to the first embodiment.

At the fourth speed (4th), first clutch C1 and second clutch C2 are brought into simultaneous engagement as indicated by hatching in FIG. 6A.

By the simultaneous engagement of first clutch C1 and second clutch C2, and first rotary element M1, the two rotary elements S1 and PC1 are directly connected to each other in the first planetary gearset PG1, so that the three rotary elements S1, PC1, and R1 of first planetary gearset PG1 rotate as a unit, and the two rotary elements S2 and R2 are directly connected to each other in the second planetary gearset PG2, so that the three rotary elements S2, PC2, and R2 rotates as a unit. Moreover, input shaft IN, first planetary gearset PG1, and second planetary gearset PG2 are directly connected to each other.

Figure 6B:
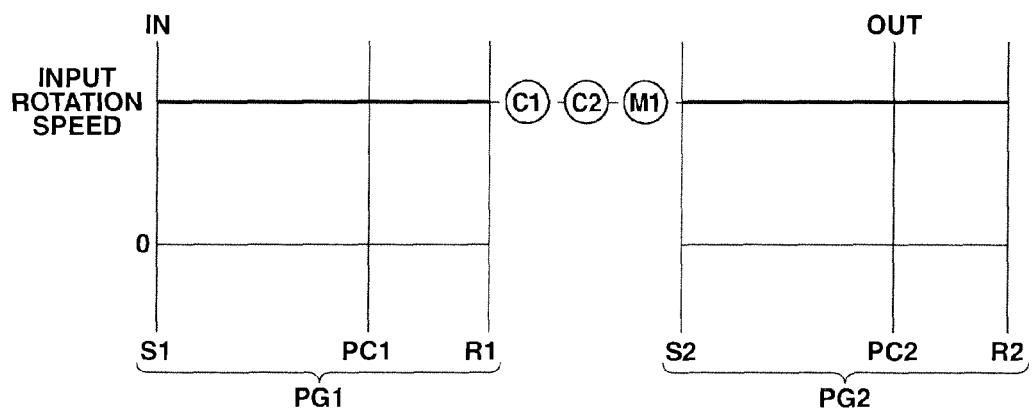
FIG. 6B is a speed diagram.

Accordingly, when input shaft IN is rotated by the input rotation speed, first and second planetary gearsets PG1 and PG2 rotate as a unit, as shown in FIG. 6B. This rotation of the second planetary gearset PG2 is outputted from second pinion carrier PC2. This output rotation speed from second pinion carrier PC2 (=the rotation speed identical to the input rotation speed from input shaft IN) is transmitted directly to output shaft OUT, so that the fourth speed (i.e., a direct connection speed) having a transmission ratio of 1 is attained.

(Reverse Speed)

Figure 7A:
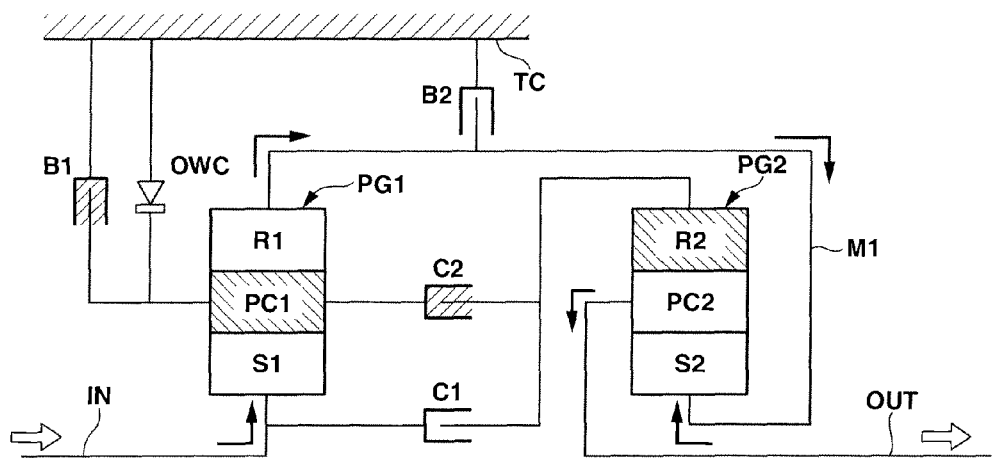
FIG. 7A is an explanatory diagram showing a shift operation at a reverse speed (Rev) in the automatic transmission according to the first embodiment.

At the reverse speed (Rev), second clutch C2 and first brake B1 are brought into simultaneous engagement, as indicated by hatching in FIG. 7A.

First pinion carrier PC1 and second ring gear R2 are fixed to transmission case TC by the simultaneous engagement of second clutch C2 and first brake B1.

Figure 7B:
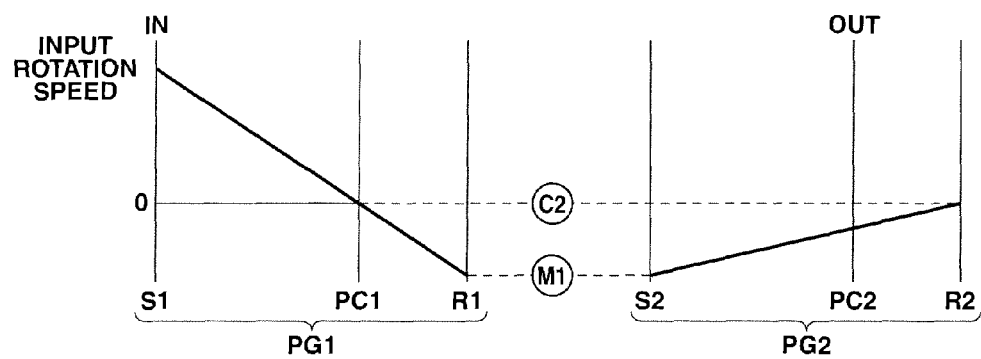
FIG. 7B is a speed diagram.

Accordingly, when the input shaft IN is rotated by the input rotation speed, the input rotation speed is inputted to first sun gear S1, as shown in FIG. 7B. Then, first planetary gearset PG1 with first pinion carrier PC1 being kept fixed is operated to reverse the input rotation, and to output this reversed rotation from first ring gear R1. This rotation from first ring gear R1 is inputted directly to second sun gear S2 through first rotary member M1. Therefore, in second planetary gearset PG2 with second ring gear R2 being kept fixed, the rotation speed of second sun gear S2 is reduced, and the rotation speed of second pinion carrier PC2 is determined. This output rotation speed from second pinion carrier PC2 (that is, rotation which is reverse in direction to that of the input rotation) is transmitted directly to output shaft OUT so that the reverse speed is attained.

Advantages of First Embodiment in Comparison to Conventional Example

Figures 8, 9:
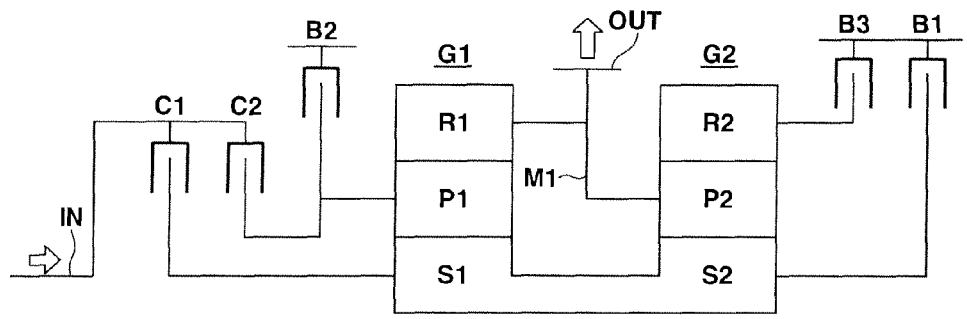
FIG. 8 is a skeleton diagram showing an automatic transmission of a conventional example.
FIG. 9 is a table showing an engagement schedule in the conventional automatic transmission for attaining four forward speeds and one reverse speed.
Figure 10A:
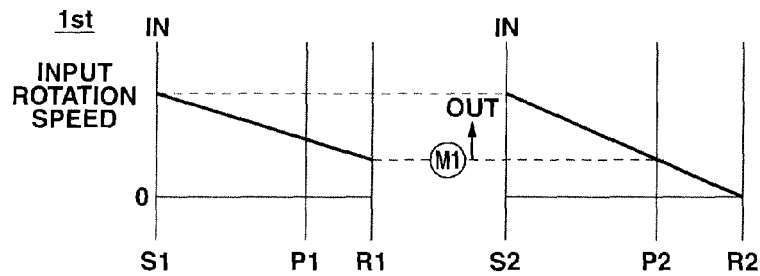
FIGS. 10A-10E are speed diagrams in the conventional automatic transmission.
Figure 10B:
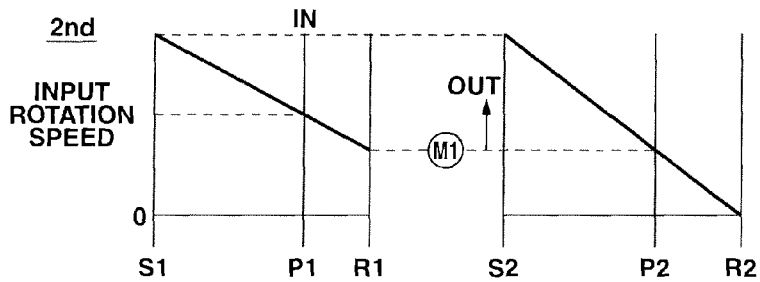
Figure 10C:
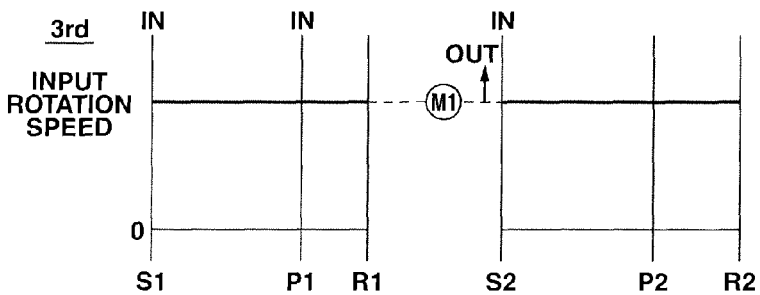
Figure 10D:
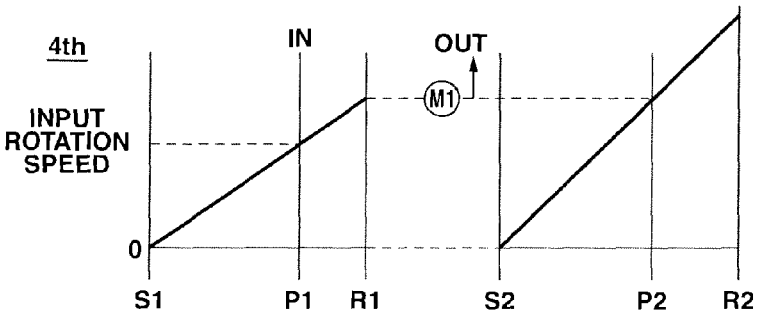
Figure 10E:
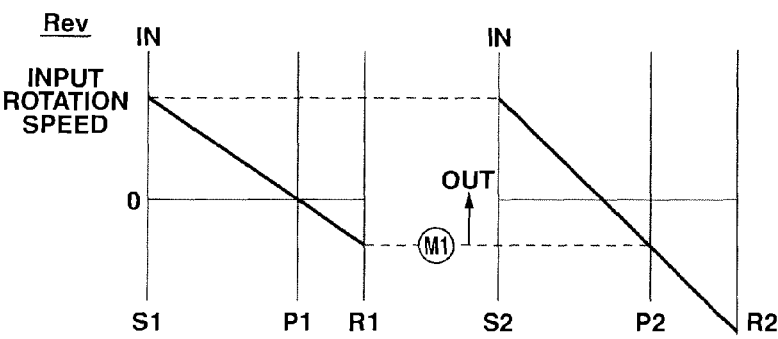

FIG. 8 is a skeleton diagram showing an automatic transmission of a conventional example. FIG. 9 is a table showing an engagement schedule in the conventional automatic transmission for establishing four forward speeds and one reverse speed. FIGS. 10A-10E are speed diagrams in respective gear stages in the conventional automatic transmission. Referring to FIG. 8 to FIGS. 10A-10E, the advantages of the automatic transmission according to the first embodiment in comparison to that of the conventional example will be explained hereinafter.

First, in comparison to the conventional automatic transmission as shown in FIG. 8 and FIG. 9, the automatic transmission according to the first embodiment as shown in FIG. 1 and FIG. 2 has the same performance as that of the conventional automatic transmission in view of the following points.

(Shift Performance)

Both the automatic transmission according to the first embodiment and the conventional automatic transmission establish four forward speeds and one reverse speed.

(Gear Ratio Coverage)

Both the automatic transmission according to the first embodiment and the conventional automatic transmission attains a gear ratio coverage of 4 or more which represents a range of change in the gear ratio (=minimum speed gear ratio/maximum speed gear ratio) which is referred to as "RC". Accordingly, it is possible to attain both a good start performance at the minimum speed gear ratio and a high speed fuel economy at the maximum speed gear ratio while keeping the appropriate value of the step ratio between the gear ratio at one speed and the gear ratio at another speed adjacent to the one speed. Here, the "appropriate value of the step ratio between the gear ratios at the adjacent speeds" means such a condition that in a case where the step ratios between the gear ratios at the respective adjacent speeds are plotted to draw a characteristic curve thereof, the characteristic curve drops with a smooth gradient from a low gear side toward a high gear side and then levels off.

However, the automatic transmission according to the first embodiment has advantages in view of the following points (a) to (e) as compared to the conventional automatic transmission.

(a) Basic Construction

When the plurality of the gear stages are attained by the planetary gearsets and the friction elements, the number of the components constituting the automatic transmission becomes smaller as the number of the friction elements is smaller. With this, it is possible to attain the size reduction, the weight reduction, and the cost reduction of the automatic transmission. Accordingly, it is preferable that the number of the friction elements in the automatic transmission is smaller.

The conventional automatic transmission uses two single-pinion planetary gearsets, and five friction elements (two clutches, and three brakes) for attaining four forward speeds and one reverse speed. In contrast, the automatic transmission according to the first embodiment attains the four forward speeds and the one rearward speed by the two single-pinion planetary gearset and the four friction elements (the two clutches and the two brakes), as shown in FIG. 1.

The number of the automatic transmission according to the first embodiment is smaller by one than the number of the conventional automatic transmission. Accordingly, it is possible to decrease the number of the components constituting the automatic transmission, and to attain the size reduction, the weight reduction, and the cost reduction.

Moreover, in the automatic transmission according to the first embodiment, all of the planetary gearsets are constituted by the single-pinion planetary gearset. Accordingly, it is possible to decrease the number of the components relative to using the double-pinion planetary gearset, and to further improve the size reduction, the weight reduction, and the cost reduction of the automatic transmission.

(b) Shift Efficiency

In the conventional automatic transmission, as shown in FIG. 9, the third speed is the direct connection speed, and the first speed and the second speed are set as the underdrive gear stage. Accordingly, the engine speed becomes higher with respect to the necessary torque. Therefore, the efficiency is low, for example, at the underdrive gear stage which is frequently used at the running in the urban area and so on in which the stops and the starts of the vehicle are repeated.

In contrast, in the automatic transmission according to the first embodiment, as shown in FIG. 2, the fourth speed is the direct connection speed, and the first to third speeds are set as the underdrive gear stage. Accordingly, for example, even at the underdrive gear stage which is frequently used at the running in the urban area and so on in which the stops and the starts of the vehicle are repeated, it is possible to suppress the engine speed with respect to the necessary torque, and to improve the fuel economy and the efficiency. Moreover, a shift interval on the underdrive side becomes small relative to the conventional example. Accordingly, it is possible to suppress the unevenness of the driving force between the gear stages, and the shift shock.

(c) Reverse Power Performance

A ratio between the first speed gear ratio and the reverse speed gear ratio determines start acceleration ability and ascent ability of the vehicle. For instance, in a case where a ratio between the first speed gear ratio and the reverse speed gear ratio is equal to or smaller than 1, that is, in a case where the reverse speed gear ratio is smaller than the first speed gear ratio, the driving force at the reverse start becomes smaller than the driving force at the forward start, resulting in deterioration in reverse start ability of the vehicle.

In the conventional automatic transmission, as shown in FIG. 9, the ratio Rev/1st between the first speed gear ratio and the reverse speed gear ratio is 0.826. Accordingly, the reverse speed gear ratio is smaller than the first speed gear ratio. The driving force at the reverse is deficient, resulting in deterioration in reverse start ability of the vehicle.

In contrast, in the automatic transmission according to the first embodiment, as shown in FIG. 2, the ratio Rev/1st between the first speed gear ratio and the reverse speed gear ratio is 1.250. Accordingly, the reverse speed gear ratio becomes larger than the first speed gear ratio, and the reverse start ability of the vehicle is not deteriorated. Accordingly, it is possible to prevent the deficiency of the driving force at the reverse, and to operate the automatic transmission without deteriorating the start acceleration ability and the ascent ability of the vehicle at the reverse.

(d) Friction Element Rotation Speed

The friction elements of the automatic transmission receive the larger load as the rotation speed becomes higher. Accordingly, it is necessary that the friction elements of the automatic transmission have the strength to endure the rotation. However, in a case where the strength of the friction elements are increased, the weight of the entire automatic transmission is increased, and the size of the automatic transmission is increased. Accordingly, it is preferable that the rotation speed of the friction element in the automatic transmission is suppressed to the lower speed.

In case of the conventional automatic transmission, as shown in FIGS. 10A-10E, for example, the rotation speeds in first sun gear S1 and second sun gear S2 in the second speed, and the second ring gear R2 in the fourth speed are enormously increased with respect to the input rotation speed. Accordingly, it is necessary that the strength of the gear whose the rotation speed is increased is increased. Therefore, the weight of the entire automatic transmission is increased, and the size of the automatic transmission is increased.

In contrast, in case of the automatic transmission according to the first embodiment, as shown in FIGS. 3B, 4B, 5B, 6B, and 7B, there is no gear whose the rotation speed is increased with respect to the input rotation speed. Accordingly, the strengths of the gears do not need to be increased more than necessary. Therefore, it is possible to suppress the weight increase, and the size increase.

(e) Friction Loss in Respective Gear Stages

In a case where the respective gear stages are attained by engagements of the friction elements, it is not possible to avoid the friction loss by the oil drag which generated at the friction elements (disengaged elements) which turn free (idle). However, in the automatic transmission, it is preferable that the friction loss is smaller.

In the conventional automatic transmission, as shown in FIG. 9, the two friction elements are brought into the simultaneous engagement at each gear stage in order to attain the respective gear stages of the four forward speeds. The conventional automatic transmission has five friction elements. Accordingly, for example, the friction elements which turn free in the first speed are second clutch C2, first brake B1, and second brake B2. In this way, the number of the friction elements which turn free in each gear stage is three. In the conventional automatic transmission, the friction loss becomes large by the oil drag and so on in the three friction elements which turns free. With this, the transmission efficiency of the driving energy is deteriorated. That is, in a case where the conventional automatic transmission is applied, for example, to the engine vehicle, the friction loss by the three friction elements which turn free deteriorates the fuel economy.

In contrast, in the automatic transmission according to the first embodiment, as shown in FIG. 2, the two friction elements are brought into the simultaneous engagement at each gear stage in order to attain the respective gear stages of the four forward speeds, like the conventional automatic transmission. However, the number of the friction elements is four. Accordingly, for example, the friction elements which turn free in the first speed are first clutch C1 and first brake B1. In this way, the number of the friction elements which turn free at each gear stage is two. Accordingly, the number of the friction elements which turns free is small relative to that of the conventional example. Therefore, it is possible to suppress the friction loss of the friction elements which turn free to the small value, and to improve the transmission efficiency of the driving energy. That is, in a case where the automatic transmission according to the first embodiment is applied, for example, to the engine vehicle, it is possible to improve the fuel economy.

[Effect by One-Way Clutch]

In the automatic transmission according to the first embodiment, one-way clutch OWC is disposed parallel to first brake B1 arranged to selectively interrupt the rotation of first pinion carrier PC1.

With this, in case of shift from the first speed to the second speed, one-way clutch OWC is self-locked in the driving state. Accordingly, the engagement control of first clutch C1 and the disengagement control of second clutch C2 and second brake B2 are performed. That is, the control to self-lock one-way clutch OWC is unnecessary. Moreover, in case of shift from the second speed to the third speed, one-way clutch OWC which does not become the power transmitting path is self-disengaged. Accordingly, the only engagement control of second brake B2 is performed. The control of one-way clutch OWC is unnecessary.

In a case where one-way clutch OWC is not provided, it is necessary to control the simultaneous engagement of first clutch C1 and first brake B1, and the simultaneous disengagement of second clutch C2 and second brake B2 in case of the shift from the first speed to the second speed. Accordingly, the control becomes difficult.

Therefore, in the automatic transmission according to the first embodiment, one-way clutch OWC is provided parallel to first brake B1. With this, it is possible to facilitate the shift control.

The automatic transmission according to the first embodiment has the following functions and effects.

(1) An automatic transmission includes: a first planetary gearset (PG1) including a first sun gear (S1), a first ring gear (R1), and a first pinion carrier (PC1) as a single-pinion carrier which supports a first pinion gear (P1) engaged with the first sun gear (S1) and the first ring gear (R1); a second planetary gearset (PG2) including a second sun gear (S2), a second ring gear (R2), and a second pinion carrier (PC2) as a single-pinion carrier which supports a second pinion gear (P2) engaged with the second sun gear (S2) and the second ring gear (R2); an input shaft (IN) constantly coupled to the first sun gear (S1); an output shaft (OUT) constantly coupled to the second pinion carrier (PC2); a first rotary member (M1) constantly connecting the first ring gear (R1) and the second sun gear (S2); a first friction element (C1) selectively connecting the first sun gear (S1) and the second ring gear (R2); a second friction element (C2) selectively connecting the first pinion carrier (PC1) and the second ring gear (R2); a third friction element (B1) selectively interrupting a rotation of the first pinion carrier (PC1); and a fourth friction element (B2) selectively interrupting a rotation of the first rotary member (M1), the automatic transmission attaining first to fourth forward speeds and one reverse speed.

Accordingly, it is possible to attain the size reduction, the weight reduction, and the cost reduction while the automatic transmission attains the four forward speeds and the one reverse speed.

(2) The automatic transmission further includes a one-way clutch (OWC) disposed parallel to the third friction element (B1).

Accordingly, it is possible to facilitate the control of the shift elements at the shift operation including the engagement or the disengagement of the third friction element.

(3) Each of the four forward speeds is attained by a simultaneous engagement of two friction elements selected from four friction elements of the first friction element (C1), the second friction element (C2), the third friction element (B1), and the fourth friction element (B2); and the four forward speeds include a first speed attained by a simultaneous engagement of the second friction element (C2) and the fourth friction element (B2), a second speed attained by a simultaneous engagement of the first friction element (C1) and the third friction element (B1), a third speed attained by a simultaneous engagement of the first friction element (C1) and the fourth friction element (B2), and a fourth speed attained by simultaneous engagement of the first friction element (C1) and the second friction element (C2).

Accordingly, the number of the underdrive gear stages is large. Consequently, the efficiency in the frequently-used gear stage is improved. Moreover, the interval between the step ratios becomes small, and it is possible to suppress the unevenness of the driving forces between the gear stages, and the shift shock. Moreover, the rotation speeds of the respective friction elements do not become high. Accordingly, it is possible to suppress the weight increase, and the size increase. Moreover, the number of the friction elements which turn free is small. With this, it is possible to suppress the friction loss to the small value, and to improve the transmission efficiency of the driving energy.

(4) The one reverse speed is attained by a simultaneous engagement of two friction elements selected from four friction elements of the first friction element (C1), the second friction element (C2), the third friction element (B1), and the fourth friction element (B2); and the one reverse speed is attained by the second friction element (C2) and the third friction element (B1).

Accordingly, the reverse start ability of the vehicle is not lowered, and it is possible to prevent the deficiency of the driving force at the reverse.

Second Embodiment

Next, an automatic transmission according to a second embodiment of the present invention is explained. The automatic transmission according to the second embodiment differs from that of the first embodiment in that one of the two planetary gearsets is changed to a double-pinion planetary gearset.

Figure 11:
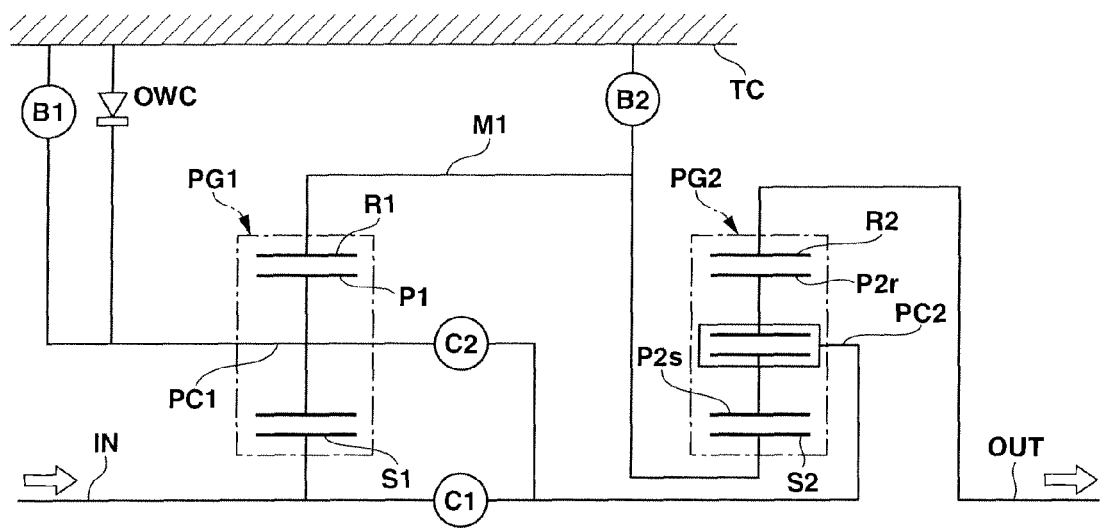
FIG. 11 is a skeleton diagram showing an automatic transmission according to a second embodiment of the present invention.

FIG. 11 is a skeleton diagram showing an automatic transmission according to a second embodiment of the present invention. Hereinafter, a construction of planetary gearsets in the automatic transmission according to the second embodiment is explained by referring to FIG. 11.

As shown in FIG. 11, the automatic transmission according to the second embodiment includes a first planetary gearset PG1, a second planetary gearset PG2, an input shaft IN, an output shaft OUT, a first rotary member M1, a first clutch C1 (i.e. first friction element), a second clutch C2 (i.e. second friction element), a first brake B1 (i.e. third friction element), a second brake B2 (i.e. fourth friction element), and a transmission case TC.

First planetary gearset PG1 is a single-pinion planetary gearset including a first sun gear S1, a first pinion carrier PC1 supporting first pinion P1, and a first ring gear R1. First pinion P1 is in meshing engagement with first sun gear S1. First ring gear R1 is in meshing engagement with a pinion gear P1.

Second planetary gearset PG2 is a double-pinion planetary gearset including a second sun gear S2, a second pinion carrier PC2 as a double-pinion carrier which supports second pinion gears P2*s* and P2*r*, and a second ring gear R2. Second pinion gear P2*s* is in meshing engagement with second sun gear S2. Second pinion gear P2*r* is in meshing engagement with second pinion gear P2*s* and second ring gear R2.

Input shaft IN receives a driving torque which is transmitted from a drive source such as an engine via a torque converter and the like. Input shaft IN is always connected to first sun gear S1.

Output shaft OUT outputs a driving torque after shifting to driving wheels through a propeller shaft, a final gear and the like. Output shaft OUT is always connected to second ring gear R2.

First rotary member M1 is a rotary member which always connects first ring gear R1 and second sun gear S2 to each other without intervention of a friction element.

First clutch C1 is the first friction element which selectively connects first sun gear S1 and second pinion carrier PC2.

Second clutch C2 is the second friction element which selectively connects first pinion carrier PC1 and second pinion carrier PC2.

First brake B1 is the third friction element which is arranged to interrupt rotation of first pinion carrier PC1 relative to transmission case TC. A one-way clutch OWC is disposed parallel to first brake B1. One-way clutch OWC is arranged to self-lock in the driving state, and to self-release in the coasting state.

Second brake B2 is the fourth friction element which is arranged to interrupt rotation of first rotation member M1 relative to transmission case TC.

The engagement operations in the automatic transmission according to the second embodiment are identical to those of the automatic transmission according to the first embodiment. Accordingly, repetitive illustrations are omitted.

Next, an operation of the automatic transmission according to the second embodiment will be explained with respect to "a shift operation at the respective gear stages".

[Shift Operation at Respective Gear Stages]

(First Speed)

Figure 12A:
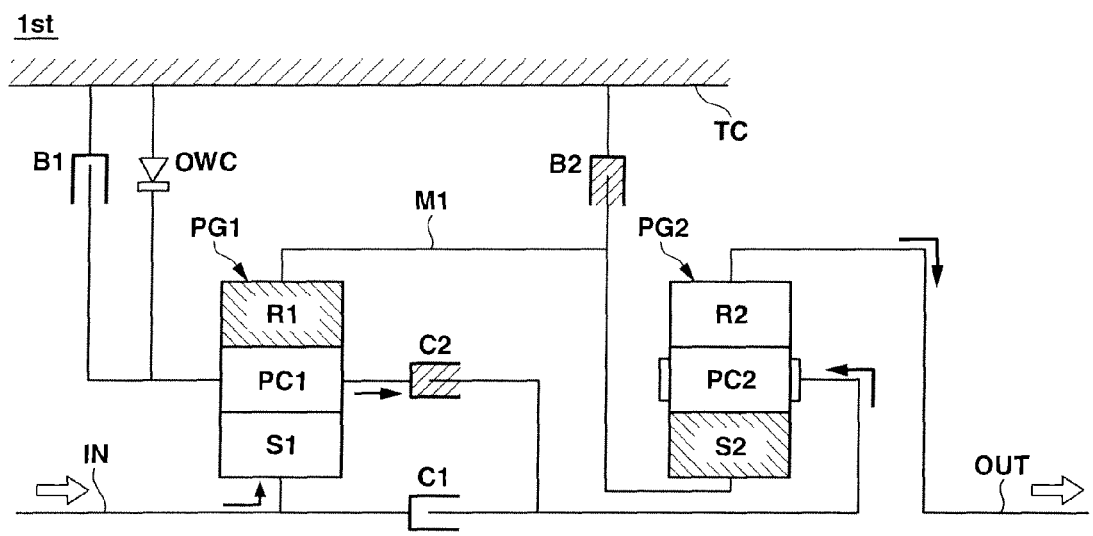
FIG. 12A is an explanatory diagram showing a shift operation at a first speed (1st) in the automatic transmission according to the second embodiment.

At the first speed (1st), second clutch C2 and second brake B2 are brought into simultaneous engagement as indicated by hatching in FIG. 12A.

First pinion carrier PC1 and second pinion carrier PC2 are directly connected to each other by the engagement of second clutch C2. First rotary member M1 is fixed to transmission case TC by the engagement of second brake B2.

Figure 12B:
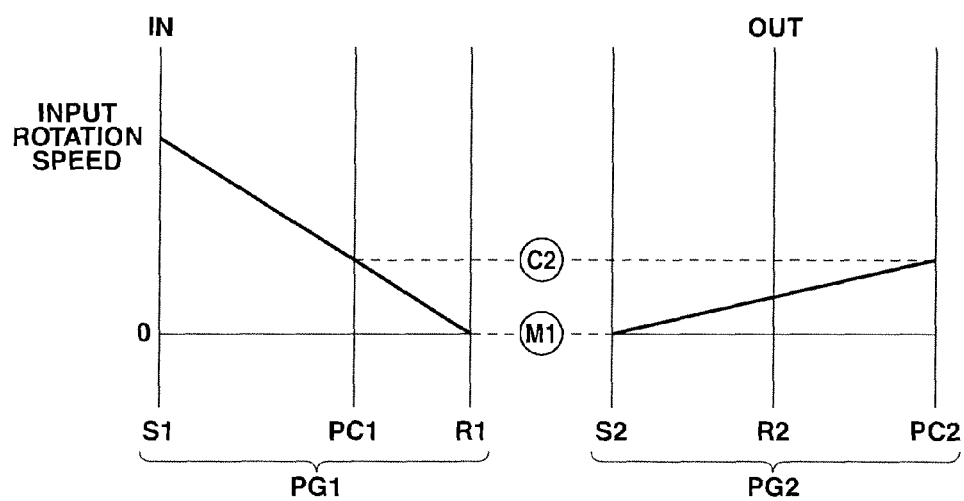
FIG. 12B is a speed diagram.

Accordingly, when input shaft IN is rotated by the input rotation speed, the input rotation speed is inputted to first sun gear S1, as shown in FIG. 12B. Then, first planetary gearset PG1 with first ring gear R1 being kept fixed is operated to reduce the input rotation speed, and to output the speed-reduced rotation from first pinion carrier PC1. This speed-reduced rotation from first pinion carrier PC1 is inputted directly to second pinion carrier PC2 through second clutch C2. Therefore, in second planetary gearset PG2 with second sun gear S2 being kept fixed, the rotation of second pinion carrier PC2 is further reduced, and the rotation speed of second ring gear R2 is determined. This output rotation speed from second ring gear R2 (=the reduced rotation speed lower than the input rotation speed) is transmitted directly to output shaft OUT, so that the first speed is attained.

(Second Speed)

Figure 13A:
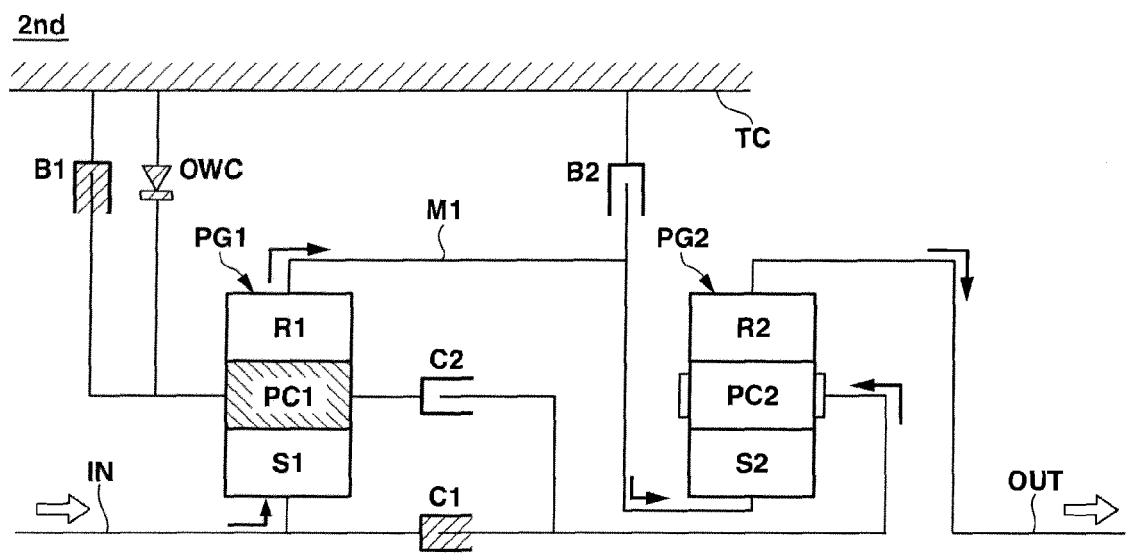
FIG. 13A is an explanatory diagram showing a shift operation at a second speed (2nd) in the automatic transmission according to the second embodiment.

At the second speed (2nd), first clutch C1 and one way clutch OWC are brought into simultaneous engagement in the driving state, and first clutch C1 and first brake B1 are brought into simultaneous engagement in the coasting state, as indicated by hatching in FIG. 13A.

Input shaft IN, first sun gear S1, and second pinion carrier PC2 are directly connected to each other by the engagement of first clutch C1. First pinion carrier PC1 is fixed to transmission case TC by the engagement of first brake B1 or one way clutch OWC.

Figure 13B:
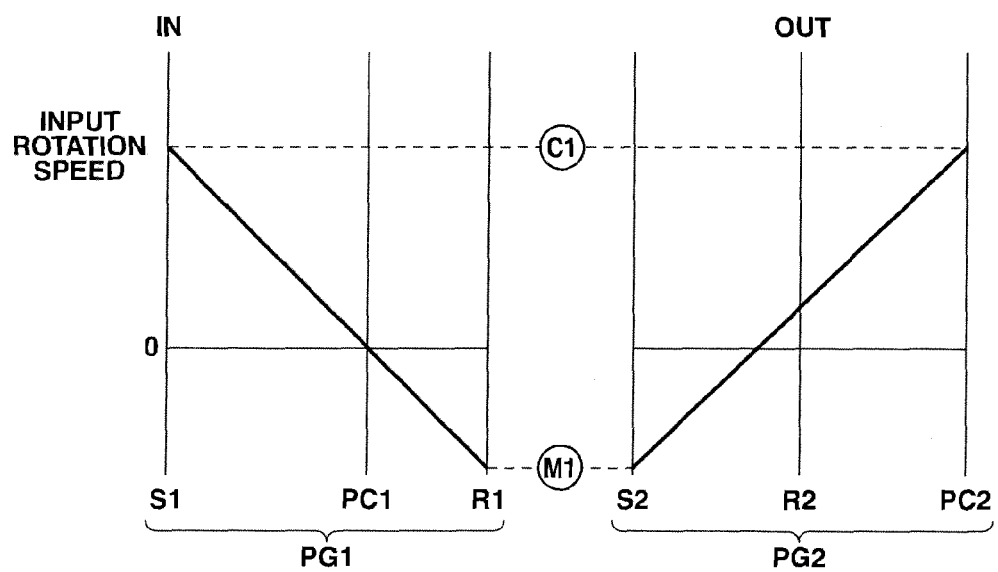
FIG. 13B is a speed diagram.

Accordingly, when input shaft IN is rotated by the input rotation speed, the input rotation speed is inputted to first sun gear S1 and second pinion carrier PC2, as shown in FIG. 13B. Consequently, in first planetary gearset PG1 with first pinion carrier PC1 being kept fixed is operated to reverse the input rotation, and to output this reversed rotation from first ring gear R1. This rotation from first ring gear R1 is inputted directly to second sun gear S2 through first rotary member M1. Therefore, in second planetary gearset PG2 having two inputs and one output, the rotation speed of second sun gear S2 and the rotation speed of second pinion carrier PC2 (=the input rotation speed) are determined. With this, the rotation speed of second ring gear R2 is determined. This output rotation speed from second ring gear R2 (=the reduced rotation speed which is lower than the input rotation speed, and which is higher than the first speed) is transmitted directly to output shaft OUT, so that the second speed is attained.

(Third Speed)

Figure 14A:
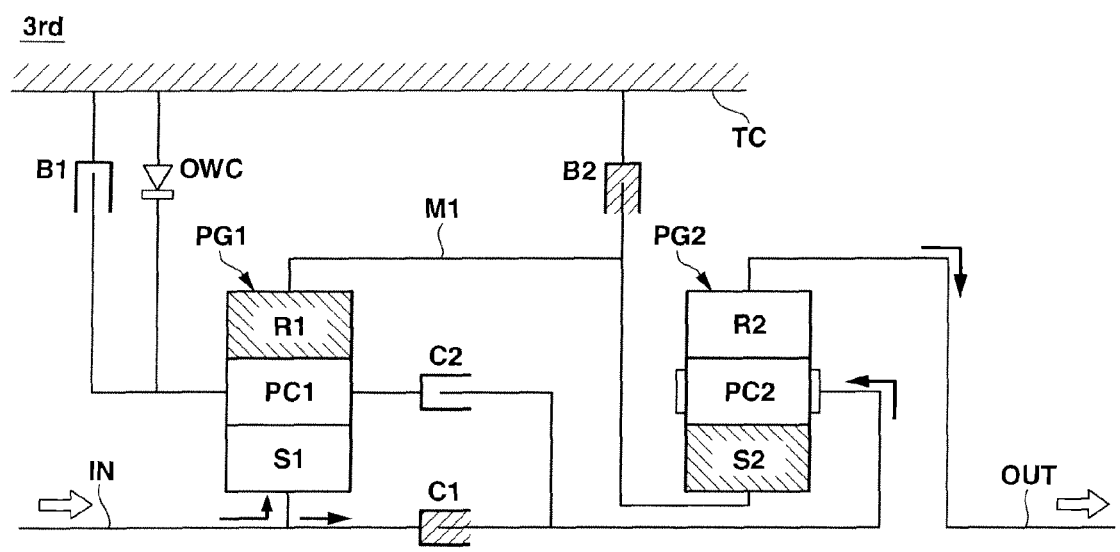
FIG. 14A is an explanatory diagram showing a shift operation at a third speed (3rd) in the automatic transmission according to the second embodiment.

At the third speed (3rd), first clutch C1 and second brake B2 are brought into simultaneous engagement as indicated by hatching in FIG. 14A.

Input shaft IN, first sun gear S1, and second pinion carrier PC2 are directly connected to each other by the engagement of first clutch C1. First ring gear R1 and second sun gear S2 are fixed to transmission case TC by the engagement of second brake B2 and first rotary member M1.

Figure 14B:
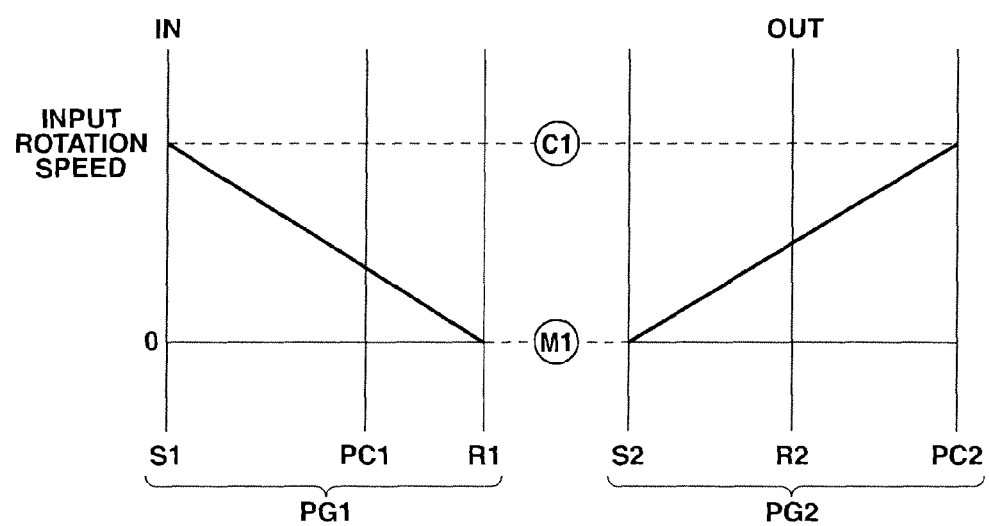
FIG. 14B is a speed diagram.

Accordingly, when input shaft IN is rotated by the input rotation speed, the input rotation speed is inputted to second pinion carrier PC2 through first clutch as shown in FIG. 14B. Consequently, in second planetary gearset PG2 with second sun gear S2 being kept fixed, the input rotation is reduced, and the speed-reduced rotation is outputted from second ring gear R2. This output rotation speed from second ring gear R2 (=the reduced rotation speed which is lower than the input rotation speed, and which is higher than the second speed) is transmitted directly to output shaft OUT, so that the third speed is attained.

(Fourth Speed)

Figure 15A:
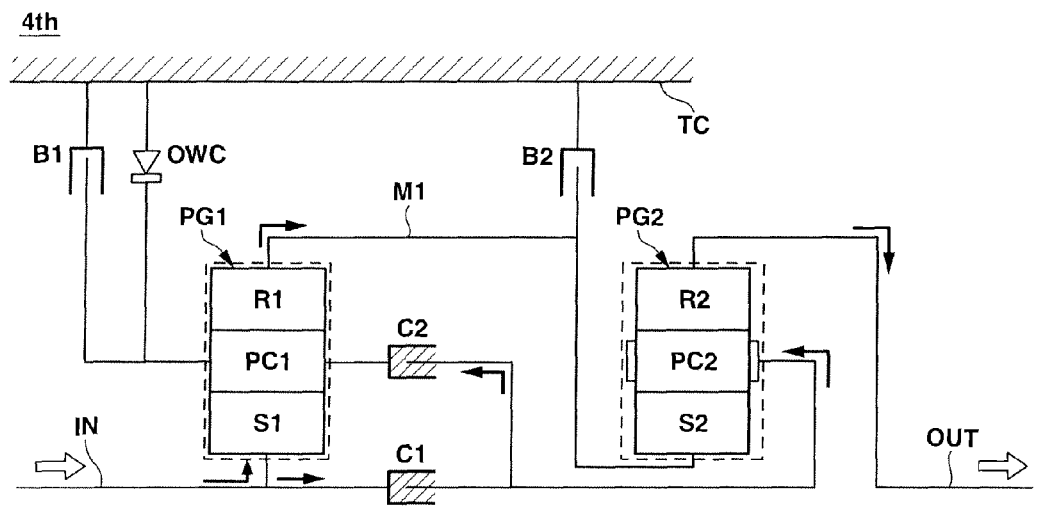
FIG. 15A is an explanatory diagram showing a shift operation at a fourth speed (4th) in the automatic transmission according to the second embodiment.

At the first speed (4th), first clutch C1 and second clutch C2 are brought into simultaneous engagement as indicated by hatching in FIG. 15A.

By the simultaneous engagement of first clutch C1 and second clutch C2, and the first rotary member M1, the two rotary elements S1 and PC1 are directly connected to each other in the first planetary gear set PG1, so that the three rotary elements S1, PC1, and R1 of first planetary gearset PG1 rotate as a unit, and the two rotary elements S2 and PC2 are directly connected to each other in the second planetary gearset PG2, so that the three rotary elements S2, PC2, and R2 rotates as a unit. Moreover, input shaft IN, first planetary gearset PG1, and second planetary gearset PG2 are directly connected to each other.

Figure 15B:
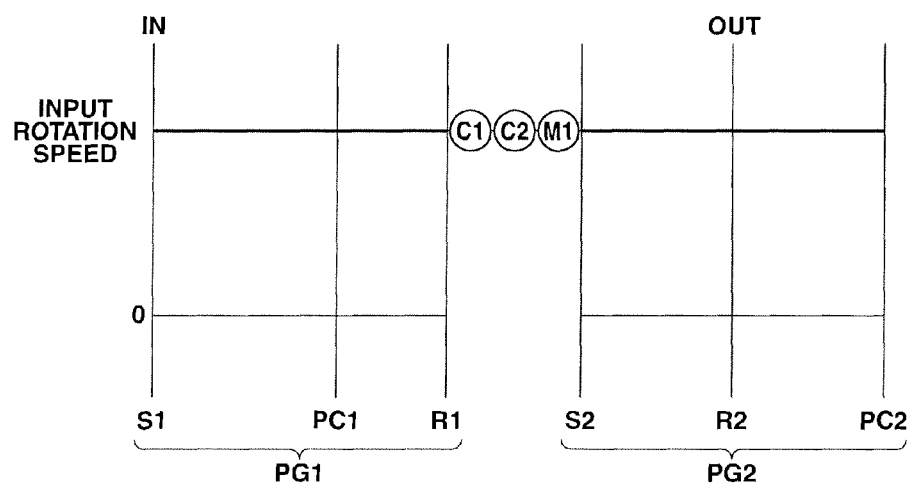
FIG. 15B is a speed diagram.

Accordingly, when input shaft IN is rotated by the input rotation speed, first and second planetary gearsets PG1 and PG2 rotate as a unit, as shown in FIG. 15B. This rotation from the second planetary gearset PG2 is outputted from ring gear R2. This output rotation speed from second ring gear R2 (=the rotation speed identical to the input rotation speed from input shaft IN) is transmitted directly to output shaft OUT, so that the fourth speed (i.e., a direct connection speed) having a transmission ratio of 1 is attained.

(Reverse Speed)

Figures 16A, 16B:
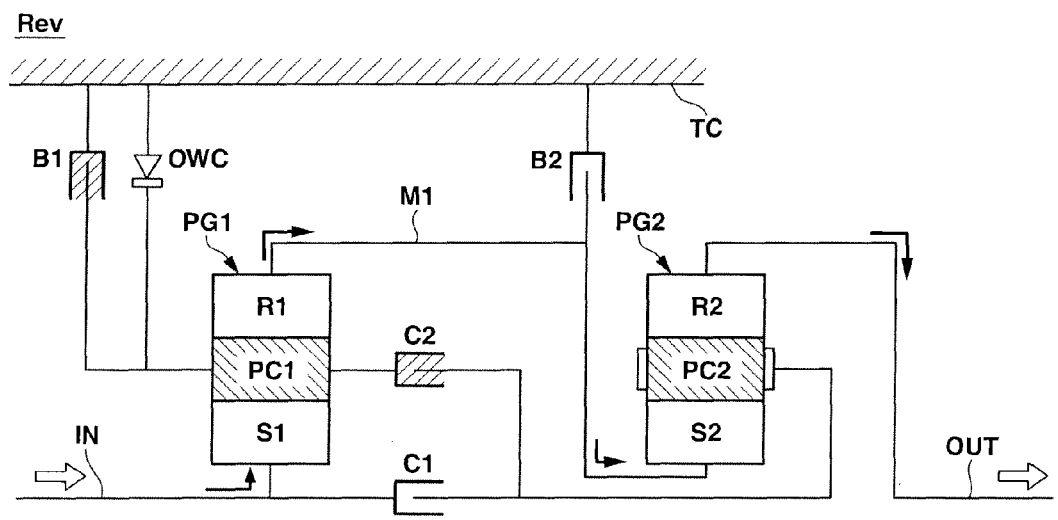
FIG. 16A is an explanatory diagram showing a shift operation at a reverse speed (Rev) in the automatic transmission according to the second embodiment.
FIG. 16B is a speed diagram.

At the reverse speed (Rev), second clutch C2 and first brake B1 are brought into simultaneous engagement, as indicated by hatching in FIG. 16A.

First pinion carrier PC1 and second pinion carrier PC2 are fixed to transmission case TC by the simultaneous engagement of second clutch C2 and first brake B1.

Accordingly, when the input shaft IN is rotated by the input rotation speed, the input rotation speed is inputted to first sun gear S1, as shown in FIG. 16B. Then, first planetary gearset PG1 with first pinion carrier PC1 being kept fixed is operated to reverse the input rotation, and to output this reversed rotation from first ring gear R1. This rotation from first ring gear R1 is inputted directly to second sun gear S2 through first rotary member M1. Therefore, in second planetary gearset PG2 with second pinion carrier PC2 being kept fixed, the rotation speed of second sun gear S2 is slightly reduced, and the rotation speed of second ring gear R2 is determined. This output rotation speed from second ring gear R2 (that is, rotation which is reverse in direction to that of the input rotation) is transmitted directly to output shaft OUT, so that the reverse speed is attained.

In this way, even when second planetary gearset PG2 is constituted as the double-pinion planetary gearset, unlike the automatic transmission according to the first embodiment, the automatic transmission having the two planetary gearsets, and the four friction elements is attained. Moreover, in the automatic transmission according to the second embodiment, it is also possible to attain the size reduction, the weight reduction, and the cost reduction while attaining the four forward speeds. Moreover, the other functions and the other effects are identical to those of the first embodiment. Accordingly, the illustrations are omitted.

The automatic transmission according to the second embodiment has the following functions and effects.

(5) An automatic transmission includes: a first planetary gearset (PG1) including a first sun gear (S1), a first ring gear (R1), and a first pinion carrier (PC1) as a single-pinion carrier which supports a first pinion gear (P1) engaged with the first sun gear (S1) and the first ring gear (R1); a second planetary gearset (PG2) including a second sun gear (S2), a second ring gear (R2), and a second pinion carrier (PC2) as a double-pinion carrier which supports second pinion gears (P2s, P2r) engaged, respectively, with the second sun gear (S2) and the second ring gear (R2); an input shaft (IN) constantly coupled to the first sun gear; an output shaft (OUT) constantly coupled to the second ring gear (R2); a first rotary member (M1) constantly connecting the first ring gear (R1) and the second sun gear (S2); a first friction element (C1) selectively connecting the first sun gear (S1) and the second pinion carrier (PC2); a second friction element (C2) selectively connecting the first pinion carrier (PC1) and the second pinion carrier (PC2); a third friction element (B1) selectively interrupting a rotation of the first pinion carrier (PC1); and a fourth friction element (B2) selectively interrupting a rotation of the first rotary member (M1), the automatic transmission attaining first to fourth forward speeds and one reverse speed.

Accordingly, it is possible to attain the size reduction, the weight reduction, and the cost reduction while attaining the four forward speeds and the one reverse speed.

In the embodiments, the gear ratio ρ1 of first planetary gearset PG1 and the gear ratio ρ2 of second planetary gearset PG2 are set to the suitable values. However, the gear ratios ρ1 and ρ2 are not limited to the specific values in the embodiments. The gear ratios ρ1 and ρ2 of planetary gearsets PG1 and PG2 can be set within allowable ranges so as to obtain a high value of the RC and an appropriate value of the step ratio between the adjacent speeds.

The automatic transmission according to the embodiments can be applied to various vehicles such as a front-engine front-wheel-drive vehicle (i.e., a FF vehicle), a hybrid vehicle, an electric vehicle, a fuel cell powered vehicle without being particularly limited to a front-engine rear-wheel-drive vehicle (i.e., a FR vehicle) having a coaxial arrangement of the input shaft and the output shaft in the first and second embodiments. Moreover, the automatic transmission according to the embodiments can be applied to a vehicle which uses, as a driving source, a diesel engine having a width of the engine speed which is narrower than that of the gasoline engine, and which has a lower torque in comparison to that of the gasoline engine with the same displacement.

The entire contents of Japanese Patent Application No. 2011-065263 filed Mar. 24, 2011 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An automatic transmission comprising:
a first planetary gearset including a first sun gear, a first ring gear, and a first pinion carrier as a single-pinion carrier which supports a first pinion gear engaged with the first sun gear and the first ring gear;
a second planetary gearset including a second sun gear, a second ring gear, and a second pinion carrier as a single-pinion carrier which supports a second pinion gear engaged with the second sun gear and the second ring gear;
an input shaft constantly coupled to the first sun gear;
an output shaft constantly coupled to the second pinion carrier;
a first rotary member constantly connecting the first ring gear and the second sun gear;
a first friction element selectively connecting the first sun gear and the second ring gear;
a second friction element selectively connecting the first pinion carrier and the second ring gear;
a third friction element selectively interrupting a rotation of the first pinion carrier; and
a fourth friction element selectively interrupting a rotation of the first rotary member,
the automatic transmission attaining first to fourth forward speeds and one reverse speed.

2. The automatic transmission as claimed in claim 1, wherein the automatic transmission further comprises a one-way clutch disposed parallel to the third friction element.

3. The automatic transmission as claimed in claim 1, wherein each of the four forward speeds is attained by a simultaneous engagement of two friction elements selected from four friction elements of the first friction element, the second friction element, the third friction element, and the fourth friction element; and the four forward speeds include a first speed attained by a simultaneous engagement of the second friction element and the fourth friction element, a second speed attained by a simultaneous engagement of the first friction element and the third friction element, a third speed attained by a simultaneous engagement of the first friction element and the fourth friction element, and a fourth speed attained by simultaneous engagement of the first friction element and the second friction element.

4. The automatic transmission as claimed in claim 1, wherein the one reverse speed is attained by a simultaneous engagement of two friction elements selected from four friction elements of the first friction element, the second friction element, the third friction element, and the fourth friction element; and the one reverse speed is attained by the second friction element and the third friction element.

5. An automatic transmission comprising:
a first planetary gearset including a first sun gear, a first ring gear, and a first pinion carrier as a single-pinion carrier which supports a first pinion gear engaged with the first sun gear and the first ring gear;

a second planetary gearset including a second sun gear, a second ring gear, and a second pinion carrier as a double-pinion carrier which supports second pinion gears engaged, respectively, with the second sun gear and the second ring gear;

an input shaft constantly coupled to the first sun gear;

an output shaft constantly coupled to the second ring gear;

a first rotary member constantly connecting the first ring gear and the second sun gear;

a first friction element selectively connecting the first sun gear and the second pinion carrier;

a second friction element selectively connecting the first pinion carrier and the second pinion carrier;

a third friction element selectively interrupting a rotation of the first pinion carrier; and a fourth friction element selectively interrupting a rotation of the first rotary member, the automatic transmission attaining first to fourth forward speeds and one reverse speed.

6. The automatic transmission as claimed in claim 5, wherein the automatic transmission further comprises a one-way clutch disposed parallel to the third friction element.

7. The automatic transmission as claimed in claim 5, wherein each of the four forward speeds is attained by a simultaneous engagement of two friction elements selected from four friction elements of the first friction element, the second friction element, the third friction element, and the fourth friction element; and the four forward speeds include a first speed attained by a simultaneous engagement of the second friction element and the fourth friction element, a second speed attained by a simultaneous engagement of the first friction element and the third friction element, a third speed attained by a simultaneous engagement of the first friction element and the fourth friction element, and a fourth speed attained by simultaneous engagement of the first friction element and the second friction element.

8. The automatic transmission as claimed in claim 5, wherein the one reverse speed is attained by a simultaneous engagement of two friction elements selected from four friction elements of the first friction element, the second friction element, the third friction element, and the fourth friction element; and the one reverse speed is attained by the second friction element and the third friction element.

* * * * *